US006676831B2

(12) United States Patent
Wolfe

(10) Patent No.: US 6,676,831 B2
(45) Date of Patent: Jan. 13, 2004

(54) MODULAR INTEGRATED MULTIFUNCTION POOL SAFETY CONTROLLER (MIMPSC)

(76) Inventor: Michael Lawrence Wolfe, 22 Old Bridge Way, Ormond Beach, FL (US) 32174

(*) Notice: Subject to any disclaimer, the term of this patent is extended or adjusted under 35 U.S.C. 154(b) by 67 days.

(21) Appl. No.: 10/222,271

(22) Filed: Aug. 16, 2002

(65) Prior Publication Data

US 2003/0034284 A1 Feb. 20, 2003

Related U.S. Application Data

(60) Provisional application No. 60/313,204, filed on Aug. 17, 2001.

(51) Int. Cl.[7] ................................................ B01D 17/12

(52) U.S. Cl. ........................... 210/85; 210/90; 210/134; 210/138; 210/143; 210/149; 210/169; 210/416.2; 4/504; 700/19; 700/65

(58) Field of Search ............................ 210/85, 90, 134, 210/138, 143, 149, 169, 416.2; 4/504; 700/19, 65

(56) References Cited

U.S. PATENT DOCUMENTS 5,172,089 A * 12/1992 Wright et al. ............... 335/205
5,616,239 A * 4/1997 Wendell et al. ............... 210/86
5,725,359 A * 3/1998 Dongo et al. .............. 417/44.9
5,730,861 A * 3/1998 Sterghos et al. .............. 210/86
5,777,544 A * 7/1998 Vander Mey et al. ... 340/310.06
5,947,700 A * 9/1999 McKain et al. ............. 417/306
6,039,543 A * 3/2000 Littleton ...................... 417/12
6,059,536 A * 5/2000 Stingl ........................ 417/44.2
6,125,481 A * 10/2000 Sicilano ......................... 4/509
6,227,808 B1 * 5/2001 McDonough .............. 417/44.2
6,342,841 B1 * 1/2002 Stingl ......................... 340/626
2002/0035403 A1 * 3/2002 Clark et al. ................... 700/65

* cited by examiner

*Primary Examiner*—Terry K. Cecil

(57) ABSTRACT

Modular Pool Safety Controller used with swimming pool or spa. The controller stands alone, or integrated with a prior art controller. Emphasis is on safety of swimmers and pool equipment, providing low entry cost. Other modular features can be added. Safety features; Swimmer Protection: Excess Suction triggers latched pump shut-down and suction dump valve that admits air into the pump inlet, instantly releasing suction entrapment. When reduced daylight combines with swimmer activity, Pool Lights are turned on. Remote Control provides Emergency shut-down. Equipment Protection: Low pump Pressure triggers latched pump shut-down. Remote Control initiates draining high water levels. Portable Intelligent Remote Alarms (PIRA) offer specific voice messages when pump shut-down occurs; guidance concerning cause and actions required, plus chimes and red lights. After Startup PIRA delivers a green OK light and specific voice message confirming the communications link. End to end test of protection is simple; frequent tests are encouraged.

20 Claims, 12 Drawing Sheets

Preferred Embodiment
Outdoor Equipment Cabinet or Junction Box
Wall Mounted Near Pump and Other
Pool Equipment (not to scale)

Shown with Front Cover Opened Up

Truth Tables and Combinational Logic for Core Safety Controller per Figure 11
switch open=0 switch closed=1

671 Pump Control via Switched Power

| Pressure | Suction | Pipe Temp. | Pump |
|---|---|---|---|
| 1 | 1 | 1 | 1 |
| 1 | 1 | 0 | 0 |
| 1 | 0 | 0 | 0 |
| 1 | 0 | 1 | 0 |
| 0 | 1 | 1 | 0 |
| 0 | 0 | 1 | 0 |
| 0 | 0 | 0 | 0 |
| 0 | 1 | 0 | 0 |

(all combinations shown)

Combinational Logic Plan for Pump ON/OFF Control

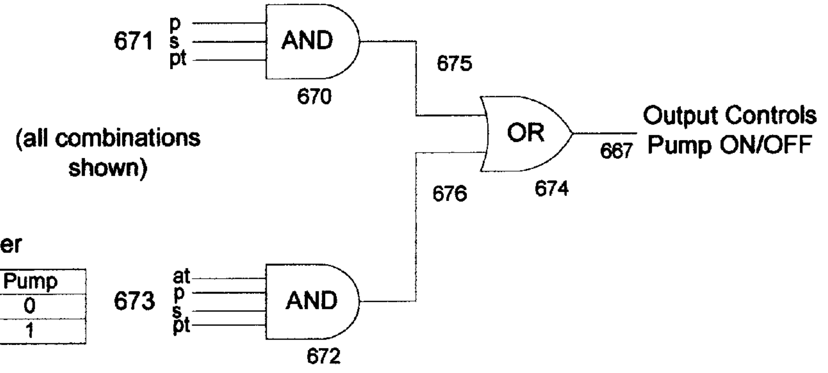

673 Pump Control via Unswitched Power

| Air Temp. | Pressure | Suction | Pipe Temp. | Pump |
|---|---|---|---|---|
| 0 | 1 | 1 | 1 | 0 |
| 1 | 1 | 1 | 1 | 1 |

(significant combinations for freeze protection shown)

681 Pool Lights ON (all combinations shown)

| Ambient Light | Motion/Sound | Lights ON |
|---|---|---|
| 1 | 1 | 1 |
| 1 | 0 | 0 |
| 0 | 1 | 0 |
| 0 | 0 | 0 |

Combinational Logic Plan for Pool Lights ON Control

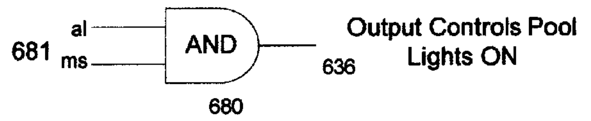

683 Alarms ON (all combinations shown)

| Pressure | Power | Alarms ON |
|---|---|---|
| 1 | 1 | 0 |
| 0 | 1 | 1 |
| 1 | 0 | 1 |
| 0 | 0 | 1 |

Combinational Logic Plan for Alarms ON/OFF

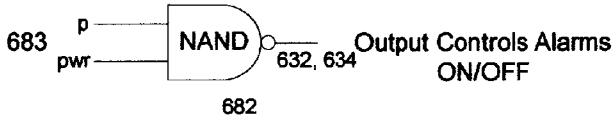

Figure 12

Figure 15
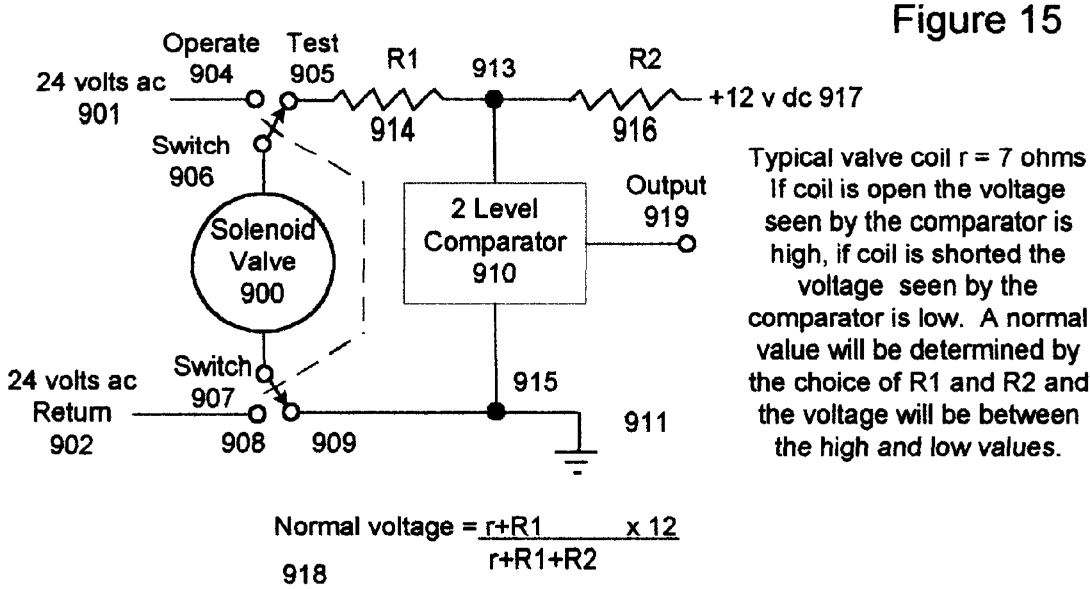
Typical valve coil r = 7 ohms If coil is open the voltage seen by the comparator is high, if coil is shorted the voltage seen by the comparator is low. A normal value will be determined by the choice of R1 and R2 and the voltage will be between the high and low values.
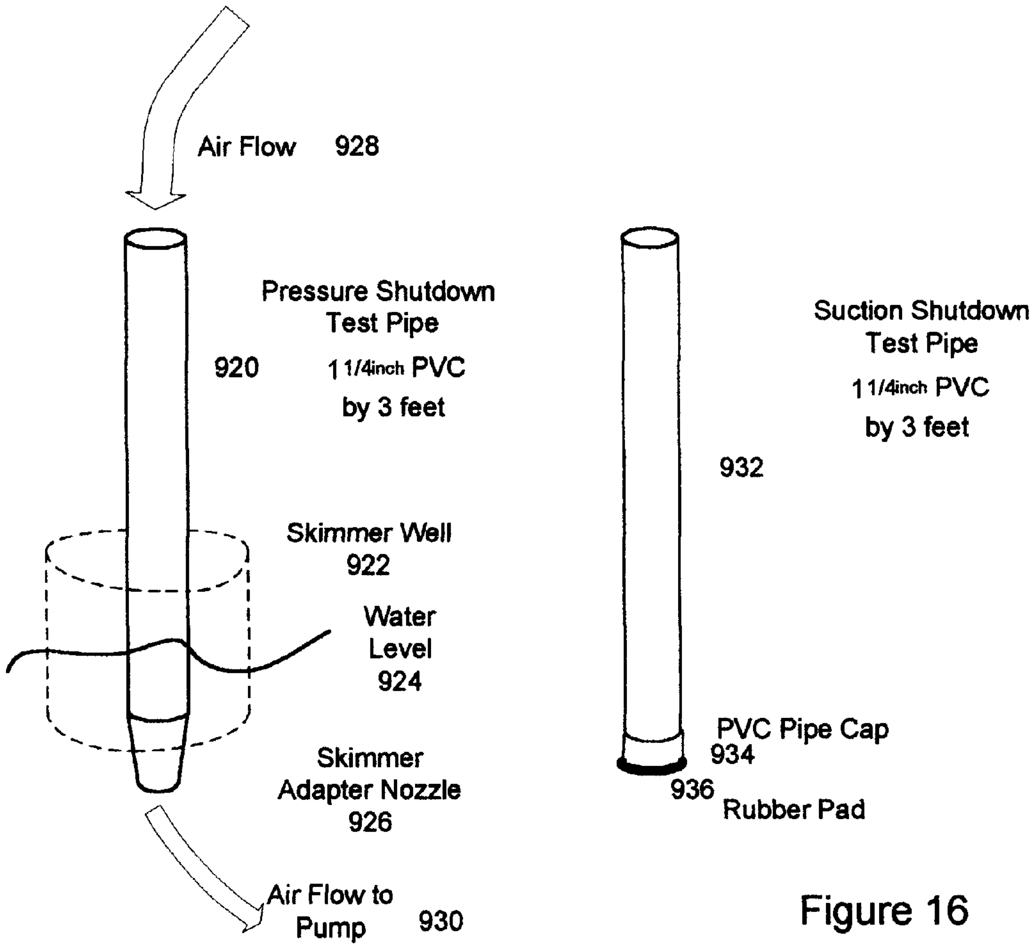
Figure 16

MODULAR INTEGRATED MULTIFUNCTION POOL SAFETY CONTROLLER (MIMPSC)

CROSS REFERENCE TO RELATED APPLICATIONS

This application is based on provisional application serial No. 60/313,204, filed on Aug. 17, 2001.

STATEMENT REGARDING FEDERALLY SPONSORED RESEARCH OR DEVELOPMENT

Not Applicable

DESCRIPTION OF ATTACHED APPENDIX

Data Sheet for the Jacuzzi MasterMind Remote Control Automated System.

BACKGROUND OF THE INVENTION

This invention relates generally to the field of swimming pool and spa controllers and more specifically to the Modular Integrated Multifunction Pool Safety Controller (MIMPSC) which may be considered as a stand alone system, or integrated with a prior art pool and spa controller.

A pool or spa controller is generally an electronic apparatus that has control of energizing or de-energizing the pool pump that is the source of all suction and pressure in the pool circulation hydraulics.

In addition, most pool controllers provide several other convenience and maintenance features but rarely do they deal with several safety issues.

For many years swimming pool safety issues have been recognized but until recently not much technology has been applied to products that can be commercially successful. In this situation pool safety controllers which could protect swimmers from entrapment or evisceration are simply not provided by most pool builders.

The other safety benefits that could have been provided to protect pool equipment from damage has also lagged because a Modular Pool Safety Controller was not available, and those controllers that are available are aimed at convenience features; and generally do not address safety issues, and are relatively costly even in basic form.

Recently, several state legislatures have taken notice of the serious pool and spa accidents that have affected families in horrendous ways, since the victims are usually children. The Federal Government has also, through the Consumer Product Safety Commission, helped to establish a safety awareness and sensible approach to providing protection from suction entrapment by defining a multilayer design strategy.

This idea includes three layers of protection: multiple, separated main drains; passive standpipe vents; and an active control device or system. Each of these layers is useful but not a complete answer to all situations. Thus, these approaches are complementary and together are a powerful solution to the problem.

The present invention is aimed at the third layer solution and includes an active control system which can offer safety and other benefits as well. This invention can readily be applied to existing or new pools, spas and/or whirlpools.

It can be appreciated that few pool and spa safety controllers have been available or in use. There are several highly capable, multifunction, pool controllers on the market, not patented, but they do not generally address the safety concerns herein described. A recent patent, Swimming Pool Control System, U.S. Pat. No. 5,730,861, March 1998, Sterghos et al, deals primarily with maintenance and convenience features, and actually describes a mode of operation that would become a major potential for single drain suction entrapment if followed. Another is: Swimming Pool Control System Having CPU and Remote Communication, U.S. Pat. No. 5,616,239, April 1997, Wendell et al, emphasizes water level control, protecting equipment from damage, and remote alarm communication.

Recently, a few single purpose suction safety devices have been brought to market. A few single purpose pump suction sensor and shut-down devices and systems have also been brought to market such as: Stingl Switch, U.S. Pat. No. 6,059,536, Stingl, May 9, 2000; and Influent Blockage Detection System, U.S. Pat. No. 6,342,841, January 2002, Stingl; and Fluid Vacuum Safety Device for Fluid Transfer Systems in Swimming Pools, U.S. Pat. No. 5,947,700, September 1999, McKain et al; and Spa Pressure Sensing System Capable of Entrapment Detection, U.S. Pat. No. 6,227,808, May 2001, McDonough.

Several other patents describe very specific capability for a single purpose using novel sensors. For example: Pump Shutoff System, U.S. Pat. No. 6,039,543, March 2000, Littleton; describes a flow switch and control circuit to shut-down a pump when there is insufficient fluid flow and pump damage may result. Also, Pool Pump Controller, U.S. Pat. No. 5,725,359, March 1998, Dongo et al; does address swimmer safety regarding suction entrapment in a pool drain, by means of a novel diaphragm switch that removes power from the pool pump when a certain change in fluid pressure (unspecified) occurs.

Deficiency in Prior Technology

The main deficiency with conventional pool and spa controllers are that these patents generally consider only a portion of the objectives established for this invention, the Modular Integrated Multifunction Pool Safety Controller (MIMPSC). As far as has been determined to date, there are no existing products in the US marketplace that achieve most or all of the objects of the Modular Integrated Pool Safety Controller (MIPSC).

The present invention substantially departs from the conventional concepts and designs of the prior art, and in so doing provides an apparatus primarily developed for the purpose of providing a Modular Integrated Multifunction Pool Safety Controller. Modular design and construction offers the ability to start with an affordable Core of Safety features, that can then or later be expanded, in the same housing, to accommodate several other optional maintenance and convenience features. The preferred embodiment as described in this application clearly depicts how this modularity can be provided.

Some other prior art deficiencies may be summarized by the following:

A Pool Safety Controller that can be Integrated with prior art Controllers, or as a stand alone system.

A safer pool environment for swimmers, and pool operators by providing means for an emergency pump shut-down with a remote control. This means that familiarity with the sometimes complex equipment pad is no longer required to take action in an emergency. The remote control safety function has generally not been part of prior art in this field, and the emergency shut-down via remote control is a feature of this invention.

A few specialized pump suction sensor switches e.g. Stingl Switch, U.S. Pat. No. 6,059,536, Stingl, May 9, 2000, and Influent Blockage Detection System, U.S. Pat. No. 6,342,841, January 2002, Stingl. These are expensive single purpose devices marketed primarily to municipal and large club pools. The MIPSC moreover, is intended primarily for residential pools and spas where cost is a significant factor. If certain cost targets and multi functionality cannot be provided, most residential pools will continue to be unprotected, with concomitant risks to users and equipment.

Suction safety requires fast, sure removal of the entrapment force, severely limiting both the magnitude and duration of that force. Hair entanglement hazards are possibly quite sensitive to the duration of the suction force as well. Stingl U.S. Pat. No. 6,342,841 asserts "there is no need to "relieve" residual vacuum in the line because water is not compressible". The present invention asserts, however, that there is a very significant increase in the total impulse (force×time) causing entrapment of a person. Recent data from an actual pool installation with the present invention showed a small increase in peak force of 12.3%, but accompanied by a large increase in the action time. The total time of significant entrapment force, as measured from the beginning of a measured rise in suction to when the shut-down returned suction to its beginning level was:

With suction dump valve: 0.417 seconds

Without suction dump: 1.503 seconds

This is a ratio of 3.6 to 1. Multiplying the force and time ratios we find that the overall entrapment impulse is four times greater if we do not "relieve" the suction with a vent to atmospheric pressure. The explanation for this situation may be related to the fact that the suction water column and pump impeller momentum does not instantly disappear when power is shutoff, but dissipates over a time period of 1.5 seconds. In the above discussion, just as in the cited patent, the measured suction was at or near the pump inlet port. Furthermore, if we examine the ratio of entrapment or entanglement time starting from when the pump is shutoff we find that:

Time from Shutoff to Atmospheric Pressure:

With Suction Dump Valve: 0.08 seconds

Without Suction Dump: approximately 4 seconds

This is considered to be reason enough to include suction relief by using a properly configured dump valve. The cited patent also describes a "safe level of vacuum as 11 in.Hg.". This level of vacuum is considered too high by several authorities, especially if prolonged action time is involved. The present invention also accounts for the minor variations present in pools with in floor cleaning systems and solar heating, but typically operates at a shut-down threshold of 8 in.Hg.

Another patent, U.S. Pat. No. 5,947,700, September 1999, McKain et al, describes an alternative embodiment of a suction entrapment release device, and mentions that the "ideal vacuum pressure at which the frangible member disintegrates is approximately 20 in.Hg." This value is considered extraordinarily high as a safe limit. In fact, it is questionable as to whether it could be achieved at the location shown, near the input to the pump, because of the presence of the second suction line from the pool.

There are, however, several prior art patents that are relevant. These patents generally consider only a portion of the objects established for this invention, the Modular Integrated Multifunction Pool Safety Controller (MIMPSC). For example, some of these patent's teachings have ignored fundamental problems such as the logical requirement for special start-up components in the initial absence of normal pump pressure (e.g. U.S. Pat. No. 5,172,089, Wright et al, Dec. 15, 1992).

The Core Safety means are integrated with a vigorous alarm function. Most of the relevant patents provide either no alarm or only a rudimentary alarm. The Portable Intelligent Remote Alarms (PIRA) provide key benefits over prior technology. First, the Alarm, or alarms, may be located anywhere on the premises that an electrical outlet is available. No special wiring is needed because the ×10 home automation protocol is used to reliably transmit control signals from the MIMPSC housing to all PIRAs through the premises electrical power network. The PIRA has stored several voice messages that instruct a user: when the System Protection is active; when a safety shut-down has occurred whether there was a Suction Problem or a Pressure Problem; and what actions should be taken to correct the problem and how to restart the system in the Automatic Protection mode. Additionally, the PIRA provides both chime alerts and visual lighted indicators to further assure that essential information is communicated quickly. The alarms continue to repeat until the main pool power switch is reset by turning it OFF and then ON. Off premises Alarms can be provided with the use of an added ×10 modem dialer, or integrated with a premises alarm system.

Other safety related functions of MIMPSC that are not described in the prior art include: turning the pool lights ON when waning daylight accompanies detected swimming activity; and allowing the safe draining of excess pool water by remote control, when a thunderstorm is actively in progress. This is a common problem in many parts of the US, and particularly in the southern states.

There are many failure modes inherent in the construction and operation of typical swimming pools, whether commercial or residential. For example, water levels can become too low leading to a loss of suction and thereby loss of circulation, with the result a dry running pump. Such a situation will lead to overheating, and damaging, the pump and motor and/or the PVC piping. It is not generally appreciated that while many pump motors are protected from overheating with thermal cutouts, the almost universally used PVC plastic piping is only rated for 140 degrees F. and the pump motor thermal cutout may not operate below 200 degrees F. When in thermal contact with an overheated pump and motor the adjacent PVC piping will distort and fail. At best, the pool is then unusable, at least until that piping can be replaced. The present invention includes a temperature sensor or switch located on the PVC piping exiting the pump pressure outlet. When the pool water is circulating normally the pipe temperature at this location is only a few degrees above the pool water temperature entering the pump. In effect the pool water is acting as a coolant for the pump motor. The sensor or switch will be set up for a temperature of 110 to 120 degrees F., at which point the pump would be latched shut-down as a loss of water flow is clearly indicated; loss of Pressure Alarms would be sounded so that this pipe temperature sensing acts as a backup for the normal loss of prime Pressure switch, thus affording an other layer of protection for the equipment at a nominal cost.

Another deficiency of conventional pool and spa controllers are that pool skimmers usually have a floating weir that can become stuck in the upright/blocking position due to excessively high water levels. This can and does happen, and has been experienced frequently, as a long standing homeowner problem, by some dealers in pool supplies. The problem is due to grout residue from the construction process, or debris in the pool water, coupled with prolonged or heavy rainfall. This situation leads to the same loss of suction and overheating hazard as described above with low water levels as the skimmer pot is pumped dry and then feeds air to the pump which loses prime. The MIMPSC invention includes a protective structure added to the skimmer weir to eliminate this problem This invention comprises one or more skimmer weir stops whose function is to assure that the hinged and floating weir does not become stuck in the blocking position when the pool water level is very high due to either heavy rainfall or a malfunctioning water supply device.

Another problem with conventional pool and spa controllers patents are that they sense only one or two physical operating parameters (e.g. pump inlet suction and/or pump outlet pressure) and therefore limit the safety and convenience features which the system controller could provide. The other extreme is an attempt to design a system which can provide for all operation and maintenance requirements, which would be very complicated and expensive, (e.g. U.S. Pat. No. 5,616,239 Wendell et al, Apr. 1, 1997). It should be noted however, that Integrating all possible pool functions is not necessarily a good idea, given the nature of the marketplace and the fact that several key system components, e.g. pool heaters (solar, or electric heat pumps, or gas fired furnaces) are major cost elements and normally are equipped with their own necessarily unique controllers. The MIMPSC invention does, however, provide means for monitoring the normal operation of these system components and will create an alarm signal in the event of a departure from normal conditions.

While these devices may be suitable for the particular purpose which they address, they are not as suitable for providing a Modular, Integrated, Multifunctional, Pool Safety Controller. The MIMPSC is structured with a Core of Safety Functions and Means of pump Control. The Core Functions and Means comprise those which must immediately shut off the pump or turn on the pump to avoid injury or damage depending on the associated Modular Sensors and the system control logic. Also, part of the Core functions and means, operating with the said control logic, are activation of Alarms and Pool Lights ON commands. Additionally, other Modular Sensors may be added-on at the same or a later time to allow the inclusion of several non-Core but valuable functions relating to maintenance and convenience.

And, when a forecast of a sudden freeze requires pool circulation overnight, the MIMPSC ambient air temperature sensor will activate the pump before a hazardous temperature occurs.

BRIEF SUMMARY OF THE INVENTION

The primary object of the invention is to provide a Pool Safety Controller as a Modular package, primarily to create an affordable, serviceable Safety Controller. Secondly, to add additional features to the Core Safety Controller. These optional features include, but are not limited to: pool filter cleaning alert, pool chemistry management, pump maintenance warning, heater controls and temperature warnings, and any other features for which sensors and/or controls are available. The optional features may be added at the initial installation or at a later time.

Another object of the invention is to provide a Pool Safety Controller that can be Integrated with prior art Controllers, or as a stand alone system.

Another object of the invention is to provide a Pool Safety Controller that is Multifunctional in terms of safety for swimmers, protection of equipment and convenience of operation.

A further object of the invention is to provide a safer pool environment for swimmers such that the pump is instantly shut-down if excessive suction occurs that could result in swimmer entrapment.

Yet another object of the invention is to provide a safer pool environment for swimmers by providing means for an emergency pump shut-down with a remote control.

Still yet another object of the invention is to provide a safer pool environment, as daylight wanes, if swimmers are detected, the pool lights are automatically turned ON.

Another object of the invention is to provide a safer pool environment for swimmers by means of persistent Portable Intelligent Remote Alarms, when the pump is shut-down for any safety reasons.

Another object of the invention is to provide a safer, and more convenient, environment when certain maintenance activities become critical; in the event of high pool water level, which must be drained promptly, perhaps in a driving rainstorm with lightning, the draining can be safely controlled remotely.

A further object of the invention is to provide protection for the pool pump and circulation system by shortly shutting down the pump in the event that the pump does not prime, or loses prime, for any reason.

Yet another object of the invention is to provide protection for the pool pump and circulation system by automatic start-up in the event of freezing temperatures.

Another object of the invention is to modify the structure of a pool skimmer such as to avoid problems with a skimmer weir becoming blocked in the closed position.

A further object of this invention is to minimize the cost, allowing safety to be a real priority in the marketplace.

Yet another object is to maximize fail-safe operation while minimizing false alarms shut-downs.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a stand alone Modular Integrated Multifunction Pool Safety Controller (MIMPSC) for use with a swimming pool and/or spa or whirlpool, a pool pump or pumps, pool pump inlet lines, pool pump outlet lines, pool drain lines, pool skimmer weir stop or stops, pool filters, pool heaters, and a pool light control comprising: combinatorial logic such that any one of several devices or means may be used to start the pool pump, but that any one of several other devices or means is able to automatically shut-down the pool pump, in the event of a system safety problem, regardless of which means was used to start-up. Such logic may be implemented with simple relays and does not require memory, microprocessor, or software, and it is inherently rugged and not as vulnerable to electromagnetic disturbances, and high temperature, which enhances fail-safe performance; a Startup Module or means comprising a timer, one or more relays, a freeze sensor, and a logical System Ready signal, electrically connected to a power relay which feeds power to a pool pump; a Shutdown Module or means comprising one or more of a suction sensor, a pressure sensor, and a pipe temperature sensor, a multiplicity of latching relays, a suction dump valve, and local alarms, the sensors and the suction dump valve are connected to suitable ports in the pool hydraulic system; a Pool Lights ON Module or means comprising an ambient light sensor, a movement sensor, a sound sensor, and a Pool Lights control interface, the sensors are located close by and elevated near the pool; an Alarm Interface Module or means comprising local alarms and a suitable communications transmitter for triggering Portable Intelligent Remote Alarms (PIRA) as required; said Portable Intelligent Remote Alarm (PIRA) comprising a communications receiver, a multiplicity of unique voice and sound status and action messages, and related visual status indicators; said Alarms, one or more, are simply plugged in to any electrical outlet inside or outside the premises, or off premises via a modem/dialer; a pool Drain Module or means comprising an electrically controlled drain valve, a timer, and a means of causing the pump Startup when necessary, the drain valve is connected to a suitable port in the pump hydraulic system; a Weir Stop, or stops, comprising a physical barrier, to prevent the weir becoming stuck in the blocking position, are connected to the pool skimmer interior side walls; and the Modules may be housed in a cabinet or junction box in proximity to said pool pump, provided with a power supply, power relays, a remote control receiver and transmitters, and time clocks, In accordance with a preferred embodiment of the invention, there is disclosed an integrated Modular Integrated Multifunction Pool Safety Controller (MIMPSC) for use with a swimming pool and/or spa or whirlpool, a pool pump or pumps, pool pump inlet lines, pool pump outlet lines, pool drain lines, pool skimmer weir stop or stops, pool filters, pool heaters, a pool light control, and a prior art Pool Controller comprising the same elements described above for the stand-alone embodiment. The Modules may be housed in a cabinet or junction box, provided by a prior art Pool Controller, and integrated with said prior art Pool Controller which shall be comprised of: a power supply, power relays, a remote control receiver and transmitters, and time clocks, in proximity to said pool pump.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 12 is truth tables and logic gate diagrams illustrating the operation of a portion of the invention.

FIG. 15 is an electrical circuit schematic diagram of a new and novel feature of the invention that improves fail-safe reliability.

FIG. 16 depicts the test pieces that are used to provide an end-to-end test of the protection system.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
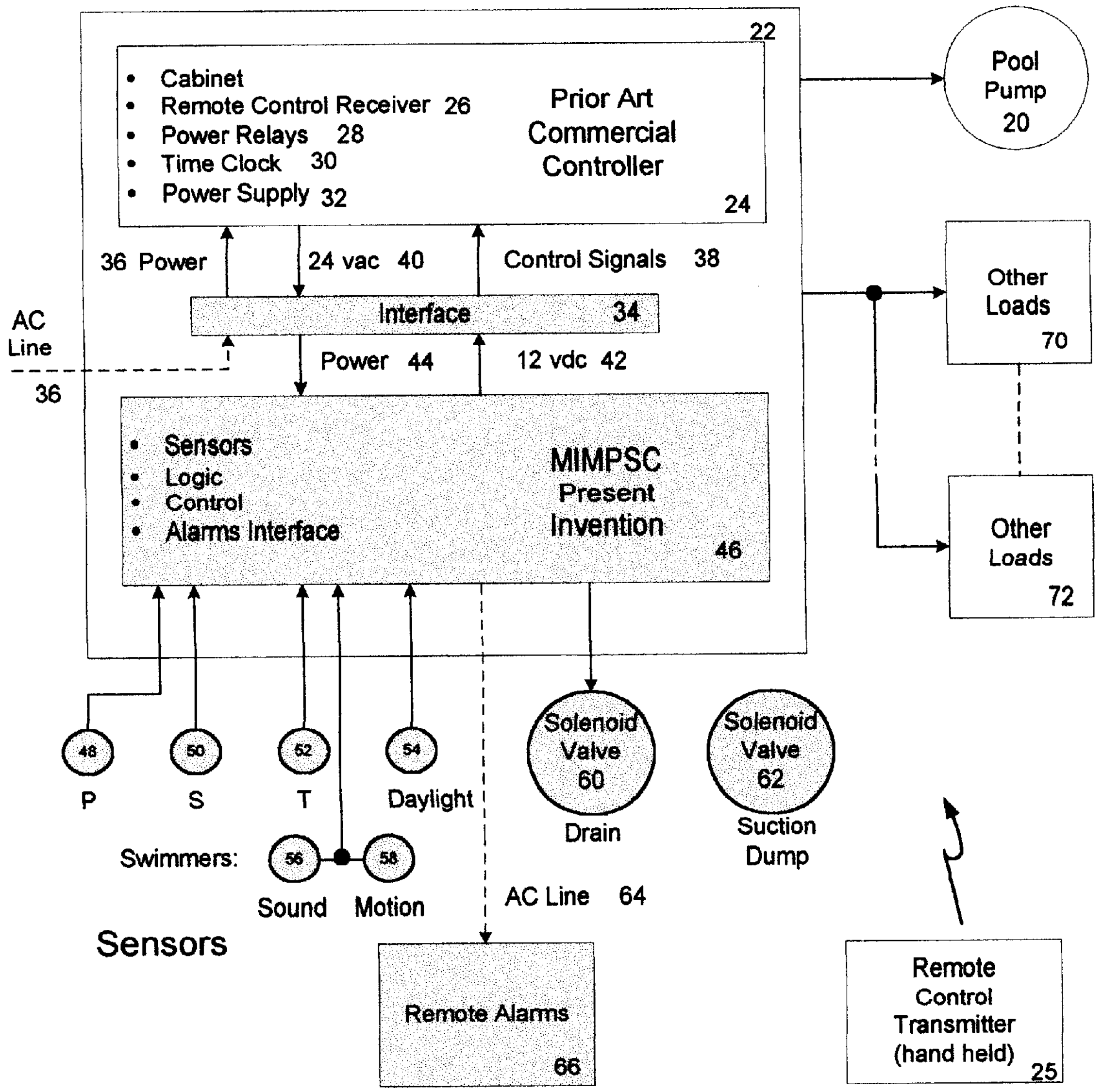
FIG. 1 is a top level schematic block diagram of the preferred embodiment of the Modular Integrated Multifunction Pool Safety Controller integrated within a prior art commercial Controller cabinet or junction box; it can also integrate externally with other prior art Controllers, or can be configured as a stand alone Controller.
Figure 2:
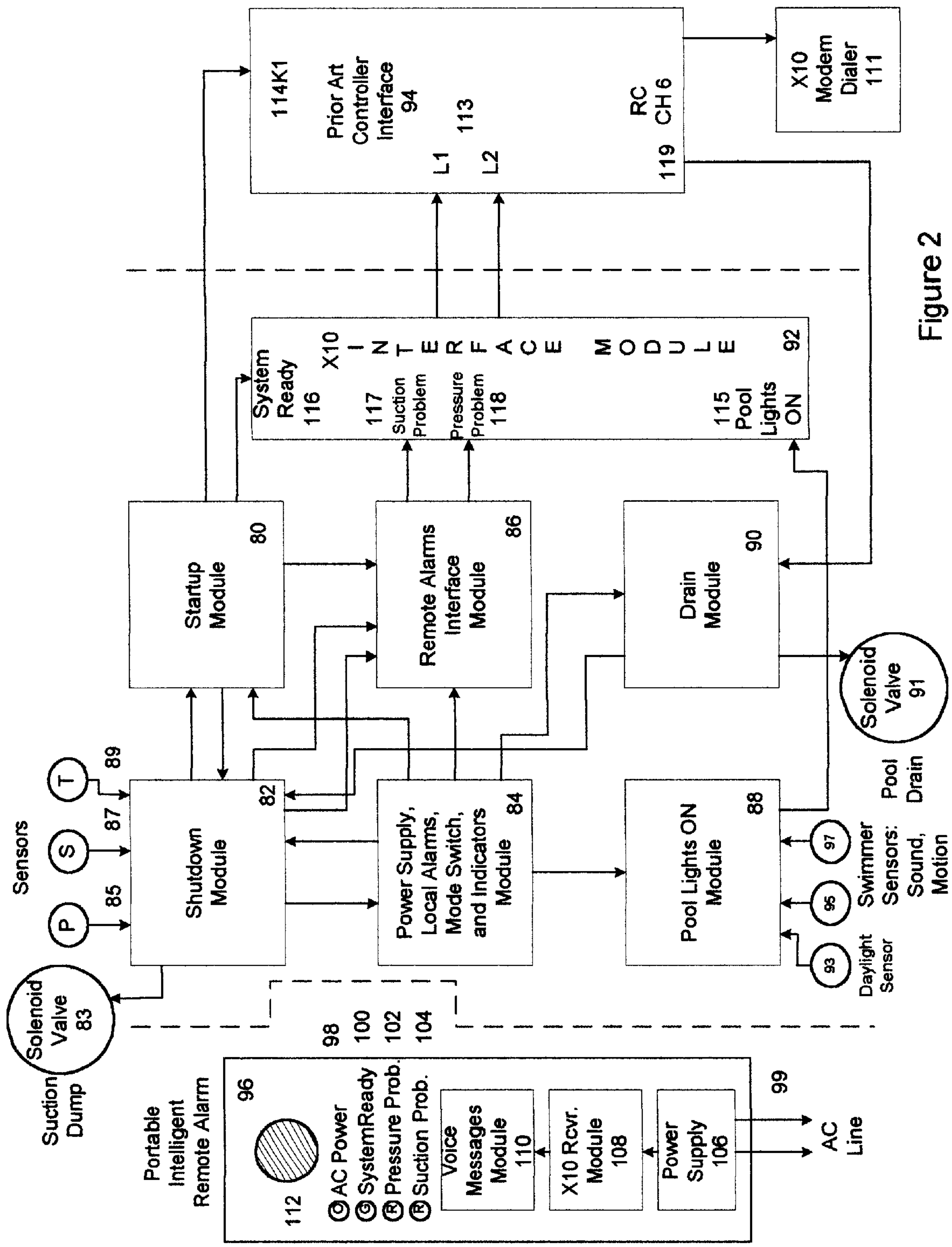
FIG. 2 is a more detailed schematic block diagram of the preferred embodiment of the Modular Integrated Multifunction Pool Safety Controller emphasizing the modular partitioning and interconnections.
Figure 3:
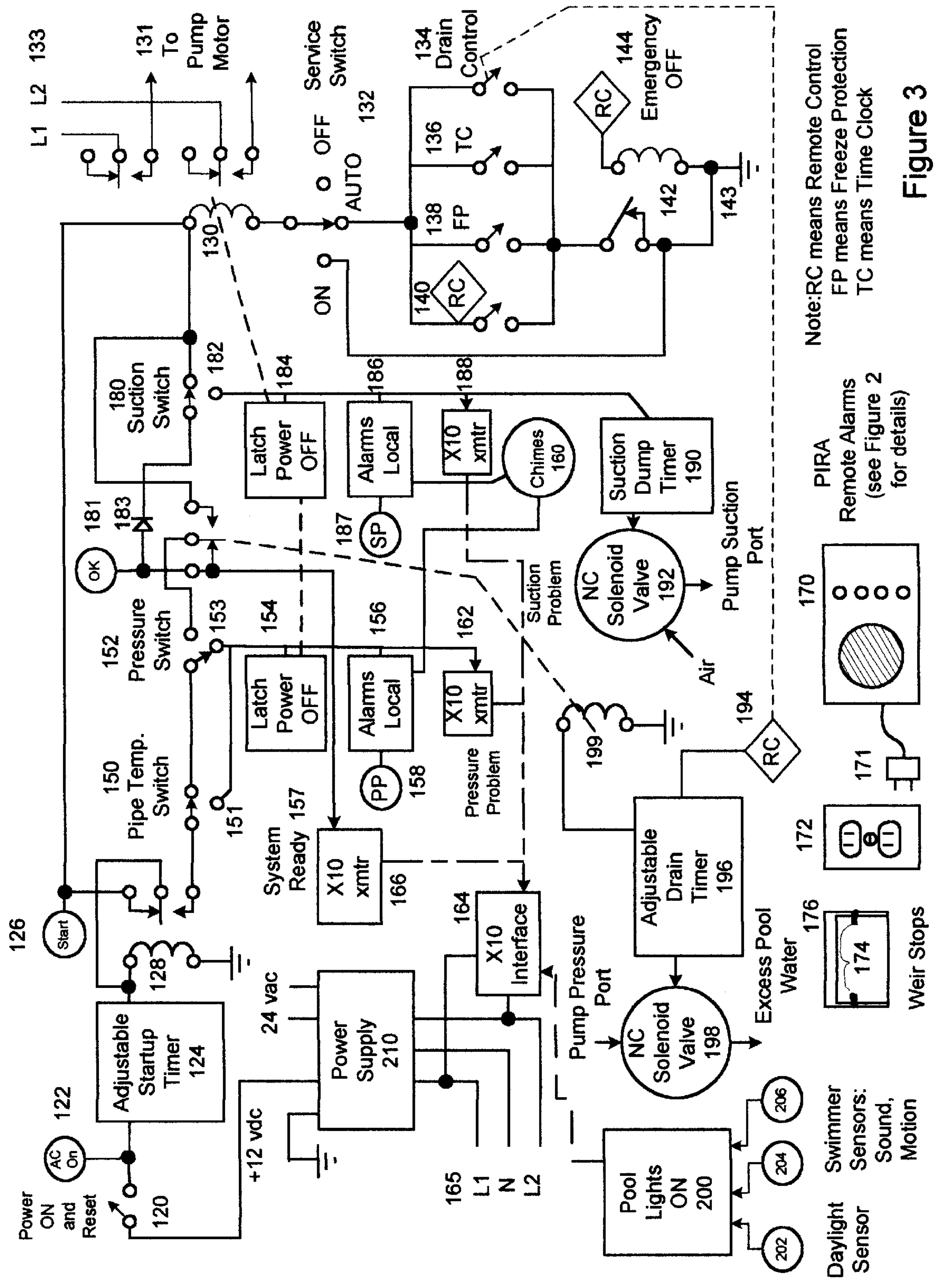
FIG. 3 is an electrical schematic diagram of the preferred embodiment of the Modular Integrated Multifunction Pool Safety Controller.

Turning first to FIG. 1 there is shown a top level schematic block diagram of the preferred embodiment of the Modular Integrated Multifunction Pool Safety Controller (MIMPSC) integrated within a prior art commercial Controller cabinet or junction box. The invention may also be used as a stand alone system by providing the auxiliary components and cabinet independent of a prior art controller. The cabinet 22 houses both the prior art controller 24, which provides none of the safety features of the present invention, and the present invention 34, and 46 through 66. The prior art controller 24 included, and provides, a remote control transmitter 25, a remote control receiver 26, power load relays 28 that switch power to the pool pump 20 and other loads 70 through 72, a time clock 30, and a power supply 32. The present invention controller 46 provides safety sensors 48 through 58, logic, control signals 38, valves 60 and 62, and an alarms interface and remote alarms 66. All these components are electrically interconnected as shown in FIGS. 2 and 3. Further details and description of the fluid interfaces of the sensors 48 and 50 and the valves 60 and 62 will follow in FIGS. 2,3 and 6.

FIG. 2 is a more detailed schematic block diagram of the preferred embodiment of the Modular Integrated Multifunction Pool Safety Controller emphasizing the modular partitioning and interconnections. The safety and protection modules are functionally shown as:

Startup Module 80

Shutdown Module 82

Power Supply, Local Alarms, Mode Switch, Indicators Module 84

Remote Alarms Interface Module 86

Pool Lights ON Module 88

Drain Module 90

×10 Interface Module 92

Portable Intelligent Remote Alarms 96

×10 Receiver Module 108

Voice Messages Module 110.

The Startup Module 80 is functionally required to provide the control signals which power the pool pump via relay K1 114, in the prior art controller 94 at start-up, and to temporarily inhibit the Shutdown Module 82, for a predetermined short period of time to allow the pump to reach normal operating conditions of suction and pressure.

The Shutdown Module 82 is the key safety element, and uses the status of the Pressure Sensor 85, Suction Sensor 87, and Pipe Temperature Sensor 89, to control the combinational logic circuit which determines whether the sensed variables represent a safe or unsafe pool system condition. After Startup, when the condition is safe a System Ready signal is generated and fed to the Indicators 84 and the ×10 Interface Module 92, which transmits an appropriate ×10 command over the premises AC line wiring network. Prior to the System Ready event chimes, both local 84 and remote 96 will sound as a warning that the system protection is not yet functioning. The Portable Intelligent Remote Alarms 96 is plugged into the AC line power 99 and receives the ×10 command signal from the ×10 Interface Module 92. The System Ready command is decoded by the ×10 Receiver Module 108 and a green indicator light 100 is lit on the Remote Alarm 96; the same type of light is also provided with the Indicators 84. At the same time, the Voice Messages Module 110 is triggered to sound a message stating that the protection system is ready and that the green light should be on proving that the system is communicating its status to the listener. The message is projected by speaker 112. This message is not normally repeated while the safe condition remains.

When an unsafe condition is sensed by sensor 87, due to an increase in suction beyond the normal limits, the pump power is instantly interrupted and latched off, and the suction dump valve 83 is energized to open admitting air to the pump suction chamber and eliminating any suction from the pool lines. At the same time the System Ready signal is turned off which results in both green lights being extinguished and warning chimes sounded. Next, the Shutdown Module 82 sends a signal to the Remote Alarms Interface Module 86 which causes an ×10 code to be transmitted from the ×10 Interface Module 92. The Remote Alarm 96 and 108 decodes said signal and both lights a red Suction Problem indicator 104 and triggers an appropriate voice message which quickly explains what has happened, what to look for, and after the condition has been dealt with how to restore normal automatic system operation. This message will repeat indefinitely until the pump main power switch has been manually shut off. A local Indicator 84 red light is also provided. The Remote Alarms Interface Module 86 can also signal to off premises locations through the ×10 Interface Module 92, the prior art Controller Interface 94, and an ×10 compatible Modem dialer 111.

The suction dump valve 83 has been found to greatly reduce the energy of the suction total impulse (force×time), by a factor of 3 to 4 times compared with no relief valve. The valve is maintained open by a timer for at least several seconds and then reclosed automatically.

A similar sequence is generated by problems sensed from Pressure sensor 85 (too low) or Pipe Temperature sensor 89 (too high), the instant shut-down of the pump is the same. The difference is in the specific voice message which is unique, and a different red light 102 is lit. Again, the message quickly explains what has happened, what to look for, and after the condition has been dealt with how to restore normal automatic system operation. This message will repeat indefinitely until the pump main power switch has been manually shut off. A local Indicator 84 red light is also provided.

The Pool Lights ON Module 88 senses conditions when it would be safer to have the pool lights go ON automatically. Daylight sensor 93 is combined with swimmer sensors for sound 95 and motion 97. When sound and motion are detected, if the daylight is below a predetermined value, a signal is sent to the ×10 Interface Module which transmits a unique code to the pool lights junction box, where a compatible ×10 receiver module controls the pool lights. When the Pool Lights ON Module 88 has determined that the lights ON is required, it is latched ON and can only be turned OFF from a wall switch away from the pool.

The Drain Module 90 can be an important safety feature, when heavy rainfall is accompanied by a lightning storm and some water must be removed quickly to avoid flooding. Under these conditions is can be hazardous to be outdoors at the pool equipment pad fumbling with stuck valves and rigging a hose. The drain module 90 is tapped into the pump outlet pressure side and is electrically connected to and controls solenoid valve 91. The module 90 operates on a timed basis in order not to drain too much at one time. The proper time setting is determined for each pool, but the recommended time is that which drains 1 to 2 inches of water. For a 15,000 gallon pool and a 1 inch irrigation solenoid valve and pressure of 18 psi the time is found to be about 10 minutes, so that one can keep up with a rainfall rate of at least 6 inches per hour, which is tropical storm typical. The timer is adjustable and can be set for more drainage under very heavy rainfall. Normally, the drain module 90 is controlled from the hand held remote control, and after the timer completes its cycle, the remote control must be reset to initiate another drain cycle. If for any reason the pool water level is reduced below the level of the skimmer port the pump will lose prime and the safety system will shutdown the pump and indicate a pressure failure. This protects the pump and other components from damage due to dry running.

Depending on the particular requirements of a given pool system, it may be necessary to disable the suction protection during pool draining unless the normal pool return circulation is valved off during draining. This occurs because the reduced back pressure on the pump during draining is reflected in higher suction values which can trigger a Suction Problem shut-down. Since we would not expect to have swimming activity in a heavy rainstorm the safety issue may be moot. The suction protection is disabled by the drain module 90 when the remote control is used to activate draining. There is also a manual switch in the equipment cabinet to activate draining in the event of a problem in the remote control link. If the pump is not running when the drain cycle is activated the drain module 90 can initiate start-up and will begin draining when the System Ready signal appears. Another mode of pool operation which requires disabling the suction protection is for pool vacuuming which requires maximum suction to properly clean the pool underwater surfaces. The remote control can be used for this purpose as well, with a time limit and chimes warning for safety.

Turning now to FIG. 3, an electrical schematic diagram of the preferred embodiment of the Modular Integrated Multifunction Pool Safety Controller. At start-up the Power ON and reset switch 120 is connected to the Startup Timer 124 and AC Indicator 122. The timer is a delay on make type so that relay 128 does not energize until the end of the timer 124 cycle. Therefore the arm on relay 128 connects 12 vdc to the normally closed contact which energizes the Start indicator 126 and the coil of pump control relay 130. If the Service Switch 132 is in the Auto position any of the four elements that can start-up the pump, Remote Control 140, Freeze Protection 138, Time Clock 136, and Drain Module 134, will complete the circuit to ground 143 via the arm and normally open contact of relay 142. Relay 142 is operated in a normally energized mode to provide an Emergency OFF with the remote control 144.

Discussing now the safety protection circuits, after Timer 124 completes its cycle, approximately 3 minutes, the normally open contact of relay 128 provides 12 vdc to the sensor switches: Pipe Temperature 150, Pressure 152, the N.C. contact of relay 199, the anode of diode 183, and Suction 180, then connecting to the top of relay 130. Now that relay is powered via the sensors and no longer through the relay 128 bypass. The Startup period is completed and the System Ready bus and green OK light 181 are activated. At that time the System Ready signal 157 is connected to the ×10 transmitter 166 and through the ×10 Interface 164 to the Remote Alarms (PIRA) 170. Pipe Temperature Switch 150 is normally closed up to 120 degrees F.; Pressure Switch 152 is normally open at start-up but closed at and above 12 psi; Suction Switch 180 is normally closed at atmospheric pressure and opens at a suction of 8 in.Hg. These values will need to be adjusted for each pool system. When an excess of pipe temperature (near the pump outlet fitting, PVC pipe) is sensed the switch arm transfers to the N.O. contact 151 and energizes the latching relay 154 which shuts off the power to the pump, triggers local alarms 156 and indicator red problem light 158, and ×10 transmitter 162, which connects to the ×10 interface 164, and sends the proper code to the remote alarms 170. See the FIG. 2 description for more details on the remote alarms. The local alarms are the chimes 160 and the problem lights for Suction 187 and Pressure 158.

Similarly, if pressure switch 152 senses a low pressure, power will flow to the N.O. contact 153 and repeat the same sequence of events. Effectively, the Pipe Temperature Switch and the Pressure Switch are acting as flow sensors and either one can shut-down the pump in the event of a loss of prime.

If Suction Switch 180 senses excessive suction it transfers power to N.O. contact 182 which energizes latching relay 184 to shut-down the pump, triggers local alarms 186 and indicator red problem light 187, and ×10 transmitter 188, which connects to the ×10 interface 164, and sends the proper code to the remote alarms 170, and triggers the suction dump timer and solenoid valve 192 admitting air into the pump suction chamber and eliminating the residual suction. The solenoid valve 192 is normally closed and since it must be fast acting and has only limited differential pressure, a direct acting type of valve is required. Also, to avoid contaminating the valve seals, unfiltered pool water has many small particles as does the air near ground level, fine mesh screens are recommended on both the inlet and outlet of the valve. The reason for this is not that the suction dump is affected, but that when the valve closes it may not seal well enough to avoid priming problems due to leaking air into the pump suction chamber. The screen on the pump side will tend to be self cleaning due to the suction effect when the valve is closed. A method of testing all solenoid valves at start-up to assure coil continuity, is a part of the invention. If continuity is absent the system will be shut-down at the end of the start-up timer cycle. Details of the method and construction are shown in FIG. 15.

The pool Drain function can be initiated by the remote control 194, or manually. The remote control energizes a Drain timer 196 which connects to and powers a N.C. irrigation type solenoid valve 198. The valve inlet comes from a tap on the pump outlet side and before the filter.

The Pool Lights ON module 200 is fed by three sensors: Daylight 202, Swimmer Sounds 204, and Swimmer Motion 206. The sound and motion sensors should be located near to and elevated from the pool. The combinatorial logic is illustrated in FIG. 12, where motion or sound is combined with low ambient light level to turn the Pool Lights ON. When turned ON they are latched and can only be turned OFF from outside the pool.

Figure 7:
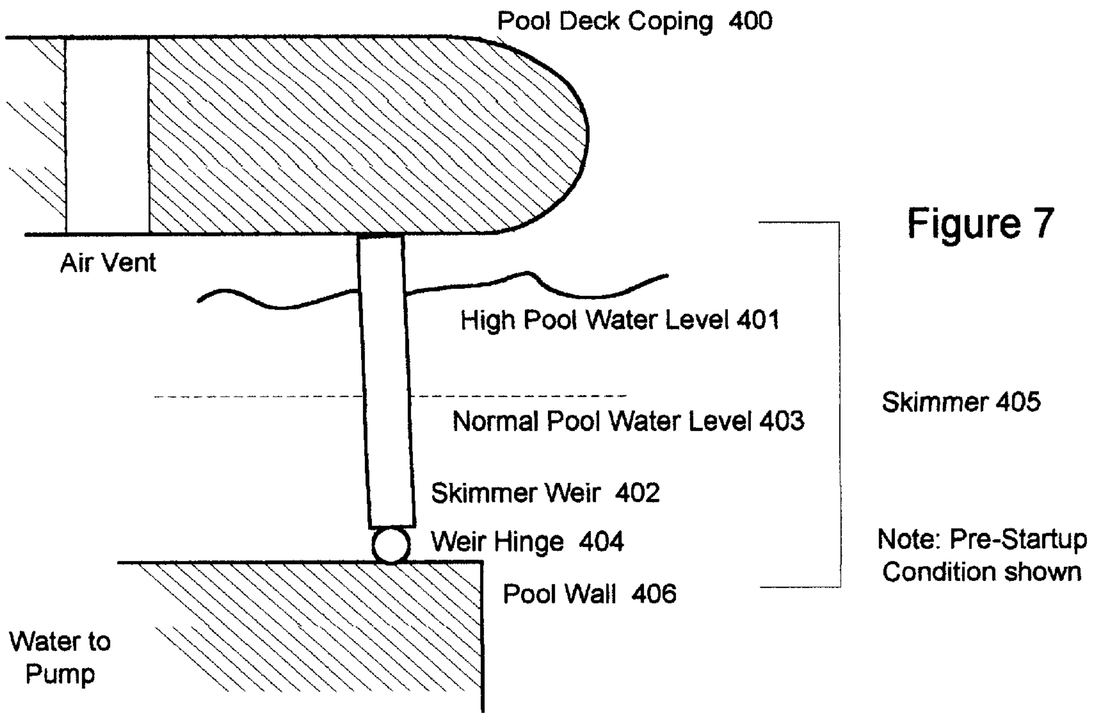
FIG. 7 is a cross sectional view of a typical pool skimmer with hinged and floating weir.
Figure 8:
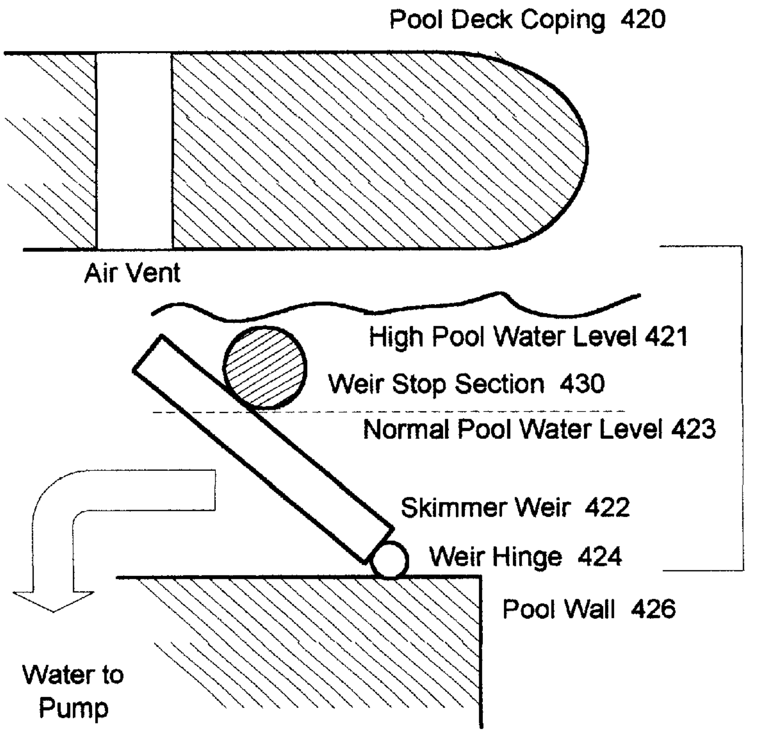
FIG. 8 is a cross sectional view of the pool skimmer with the weir stops of the invention.
Figure 9:
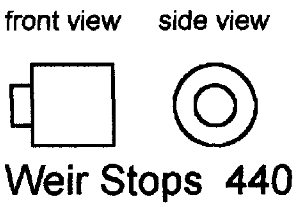
FIG. 9 is a front and side view of the weir stops of the invention.

The Weir Stops 174 are shown installed within the skimmer structure 176. They act to prevent the weir from floating up in high water conditions, and blocking the subsequent flow. That can happen due to construction debris or objects and leaves in the water. Details are shown in FIGS. 7, 8, and 9.

Figure 4:
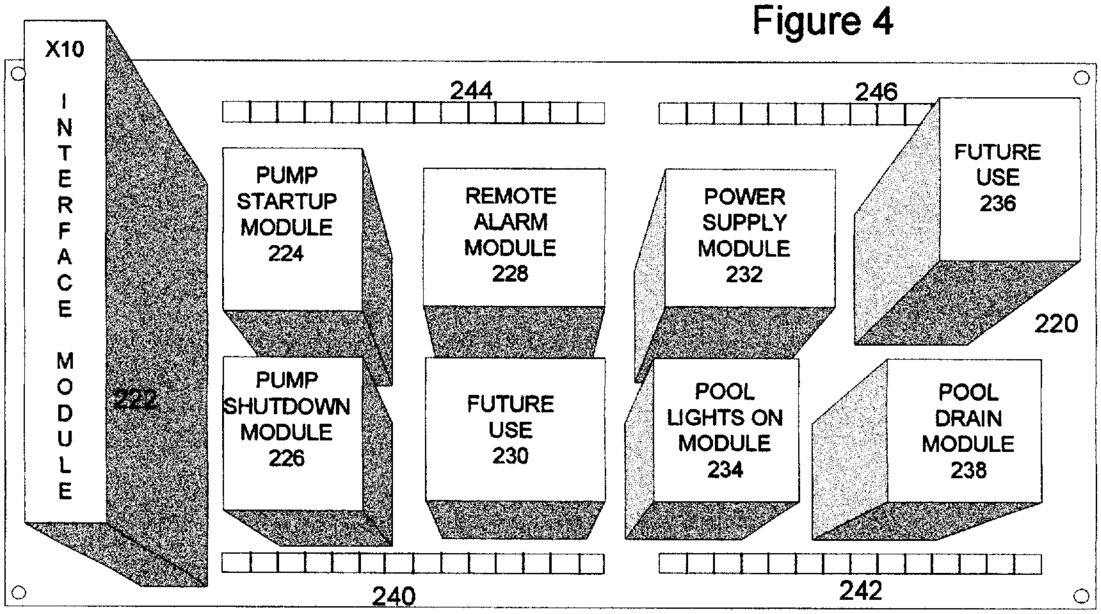
FIG. 4 is a perspective view of the mechanical structure of the modular circuit board assembly.

In accordance with the present invention, FIG. 4 is a perspective view of the mechanical structure of the modular circuit board assembly. The modules described in the foregoing are illustrated in a preferred embodiment that is compatible with some prior art pool controllers. The modules shown have already been described, FIG. 4 relates them in a mechanical and electrically interconnected sense. The modules such as the Pump Startup Module 224 can be used with the printed circuit board 220 as with sockets, or ribbon cables, and this allows flexibility in construction, installation, and upgrades. The other modules are: Pump Shut-down Module 226, Remote Alarm Module 228, the Pool Drain Module 238, the Pool Lights ON Module 234, and the ×10 Interface Module 222.

Also shown are terminal strips 240 through 246 that make convenient tie points for the external and off board mounted components such as sensors, solenoid valves, switches, indicator lights, and chimes; as well as the interfacing with the prior art controller power relays and remote control switches. Note that there is provision for add-on modules for Future Use 230 and 236.

Figure 5:
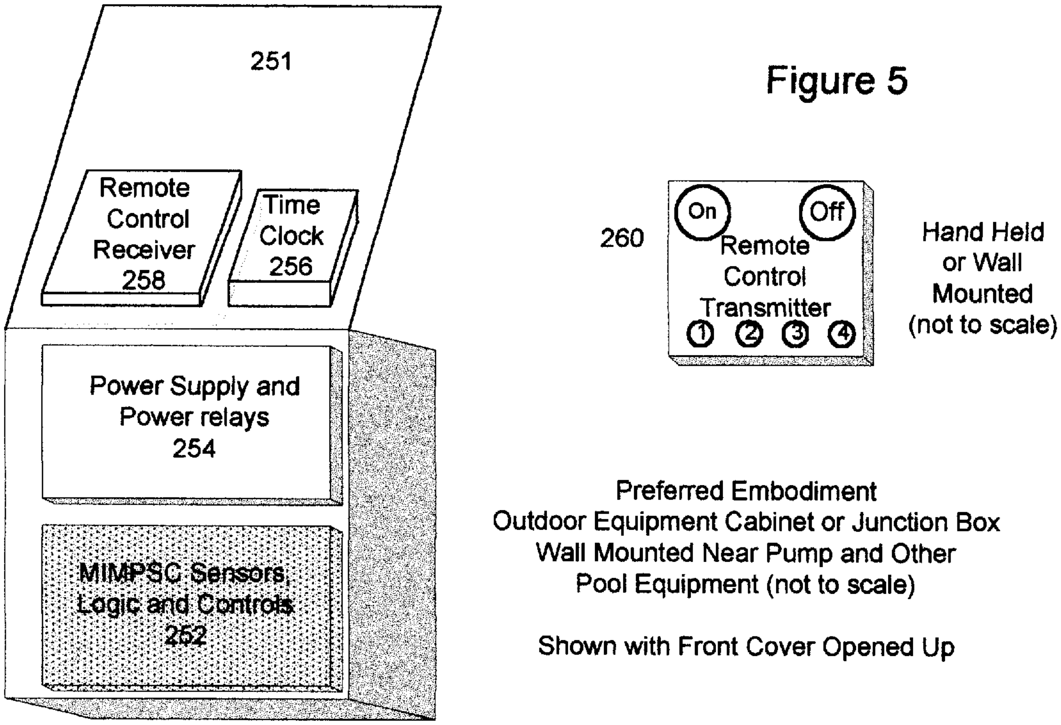
FIG. 5 is a perspective view of the mechanical integration of the modular circuit board assembly with a prior art Pool Controller.

FIG. 5 is a perspective view of the mechanical integration of the modular circuit board assembly with a prior art Pool Controller. This is a preferred embodiment wherein the Module Board 252 of FIG. 4 220 is integrated within the same cabinet as the prior art controller. This reduces installation clutter and cabling. The Power Supply and Power Relays 254, the Remote Control Receiver 258, and the Time Clock 256 are all part of the prior art controller. The Remote Control Transmitter 260, also a part of the prior art controller is designed to be hand held or placed on a table, but can also be bracket mounted on a wall. The Remote Control is shown with 4 channels but is also available with 8 or more channels. The cabinet and hinged cover 251 are made of a durable plastic which will not corrode and is watertight with respect to rain exposure. Also, the non-conductive cabinet and cover are very helpful regarding the radio link performance for the remote control 258 and 260.

Figure 6:
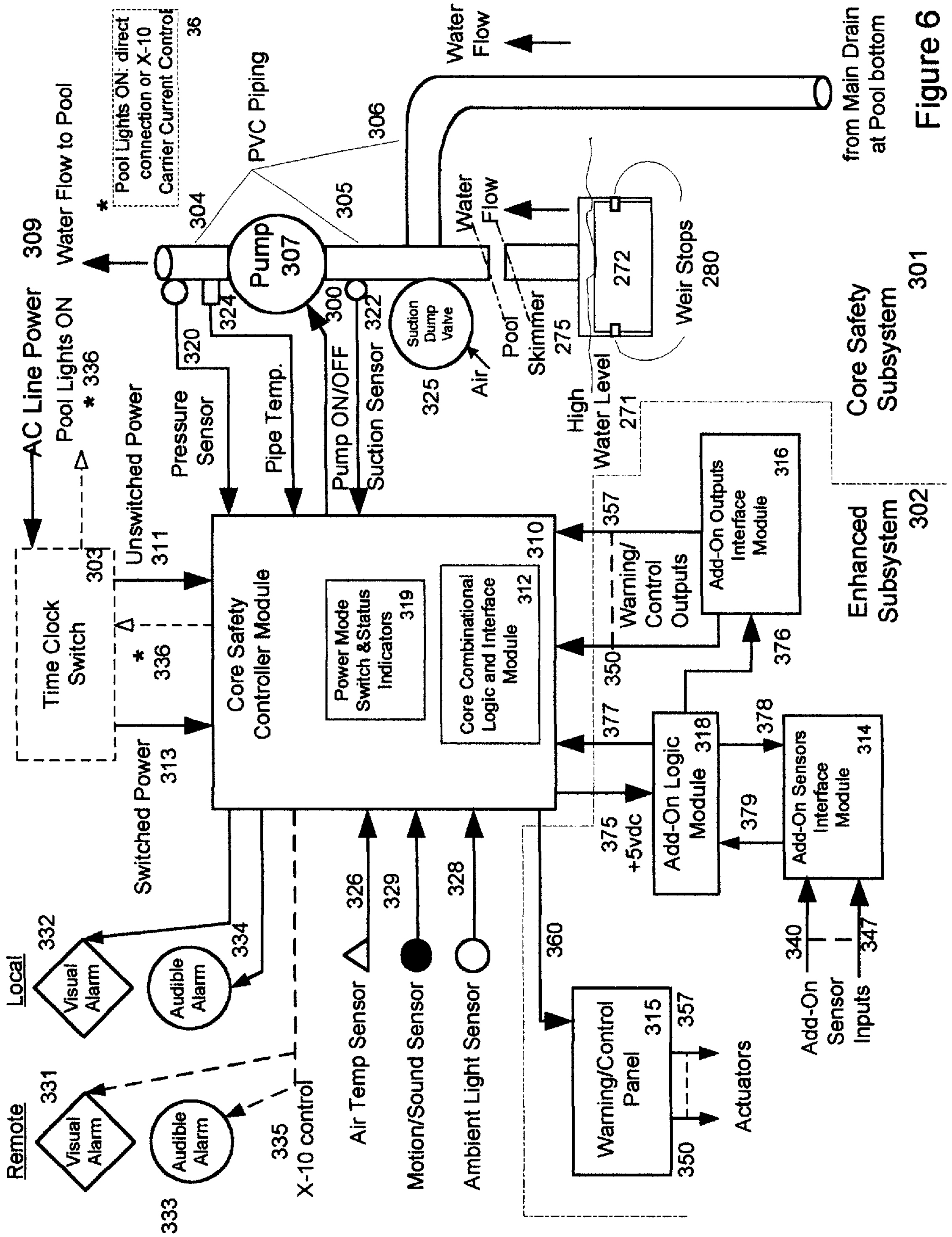
FIG. 6 is a schematic diagram of the pool hydraulics illustrating the operation of a portion of the invention; and an alternative embodiment of the Modular Integrated Multifunction Pool Safety Controller.

FIG. 6 is a schematic diagram of the pool hydraulics illustrating the operation of a portion of the invention; and an alternative embodiment of the Modular Integrated Multifunction Pool Safety Controller. The feature of most interest in this figure is the hydraulic system layout. It shows, relatively, the sensor locations with respect to the pump 307 and pool skimmer 275, Skimmer weir 272, weir stops 280, and main drain. The Suction Sensor 322 is located near or at the inlet to the pump, and senses the combined suction effect from both the skimmer 275 and the main drain line 306. The Suction Dump Valve 325 is tapped into the pump inlet and admits air to break residual suction when shut-down is triggered by the Suction Sensor 322. The PVC Pipe Temperature sensor 324, is located close to the pump 307 outlet in order to detect a significant rise in temperature of the PVC pipe that occurs in the event that the pump loses prime and is sucking air. This dry running condition is very hard on most pumps, and PVC piping; before the pump overheat sensor reacts, it is set up to open the power circuit at a temp of 280 degrees F., while the PVC maximum rated temperature is only 140 degrees F. When prolonged dry running occurs, it is not unusual for the heat generated to boil the remaining water in the pump and display visible steam. This generally requires replacing the PVC piping adjacent to the pump, which is frequently a very difficult job. Of course, if the pump goes bad that is even more costly to replace. Avoiding the stuck weir problem is the reason for inventing the weir stops 280. They are an integral part of the system because they influence the overall hydraulic performance, increase system reliability, and aid in avoiding equipment damage due to dry running. They interfere very little with the normal weir 272 function of skimming the upper layer of water for floating debris, yet will positively stop the weir 272 from blocking the skimmer port under any water level condition.

The Pressure Sensor 320 is located at or near the pump outlet before the filter inlet. Each of the Sensors provide electrical signals to the Shutdown Module of FIG. 2 82. The other part of FIG. 6 contains an alternate embodiment of the present invention with certain obvious similarities to material already described herein and other optional modules which are better described in FIG. 13.

FIG. 7 is a cross sectional view of a typical pool skimmer 405 with hinged and floating weir 402. The water level is high 401 causing the weir to float nearly vertically with the pump off. In that position it is possible for the weir to become stuck in position due to construction or floating debris in the close fitting housing. The problems that this situation can cause were described in FIG. 6 above.

FIG. 8 is a cross sectional view of the pool skimmer with the weir stops 430 of the invention. We see the same high water level 421 situation as FIG. 7 but now the weir 422 is constrained from blocking the skimmer aperture under all conditions. Note that when the water level is at the normal mid-skimmer 423 level the weir will be unconstrained by the weir stops because the weir is designed to float just below the surface of the water stream entering the skimmer.

FIG. 9 is a front and side view of the weir stops 440 of the invention. The stops are made of solid PVC, rod which is the most compatible material for pool use. A good size would be ½ inch rod. The stops are easily fastened in place with PVC pipe cement. The preferred method would be to drill the skimmer side walls to accommodate the nubs of the weir stops and then solvent cement them. The dimensions are not critical.

Figure 10:
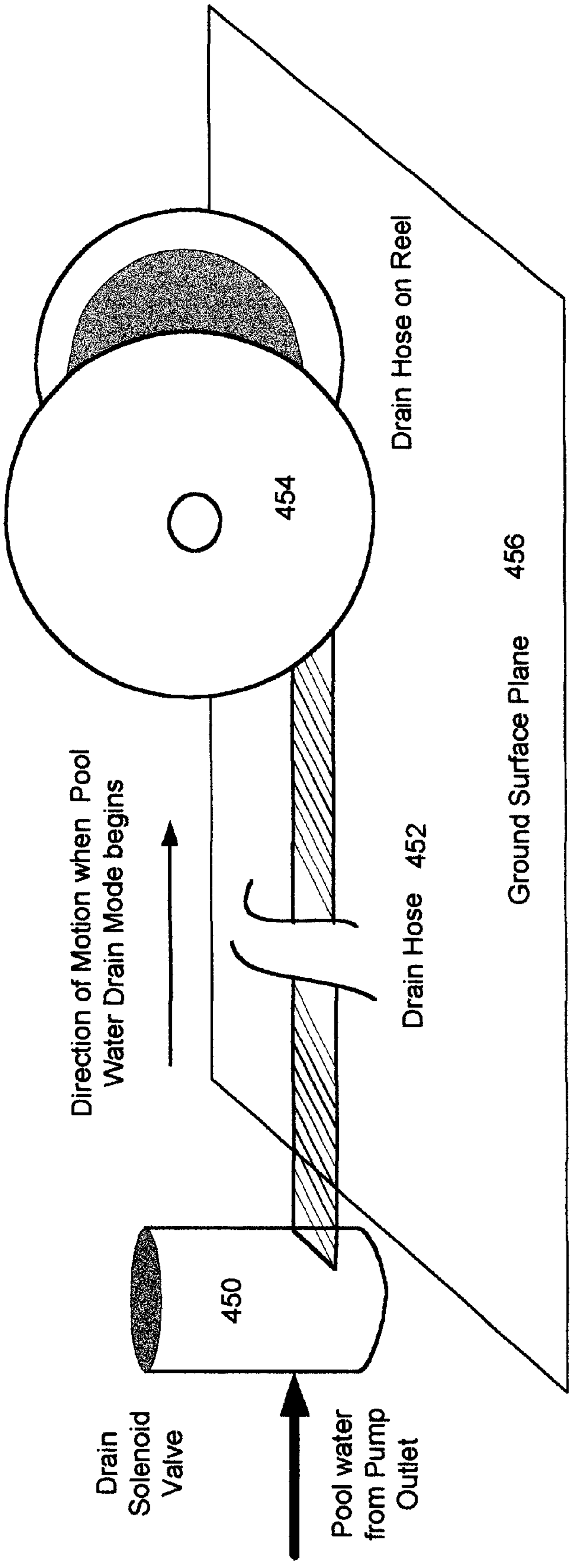
FIG. 10 is a perspective view of the pool drain hose and reel configuration of the invention.

FIG. 10 is a perspective view of the pool drain hose 452 and reel 454 configuration of the invention. A novel approach to simplifying the use and storage of a pool drain hose was developed when the addition of the Drain Module was completed. Adding the drain solenoid valve 450 led to a permanently affixed drain hose 452 that is wound on a spool or reel 454 preferably made of plastic suitable for outdoor exposure. The drain hose is normally a nominal 2 inch size, when flat and can be adapted to a standard 1 inch irrigation type solenoid valve which is well designed and very low cost because of the huge production quantities. The hose 452 will unreel on the ground surface 456 when water pressure expands the hose and propels the reel forward away from the valve 450. The hose can be attached to the reel at its core by means of cementing or other joining methods. Only the top surface of the flat hose 452 is joined to the reel 454 so that a clear channel for the water exists between the bottom of the reel hub or core and the ground surface 456. Tests have shown that a drain rate of approximately 30 gallons per minute is likely with a 1 inch valve 2 inch hose and an applied pressure of 19 psi. If greater drain rates are required larger size valves and perhaps more than one drain should be employed. Furthermore, the hose 452 can be made to self reel back up by means of a plastic spring coiled up with the hose if the lengths are not too long; otherwise, reeling by hand after the draining is complete is not difficult.

Figure 11:
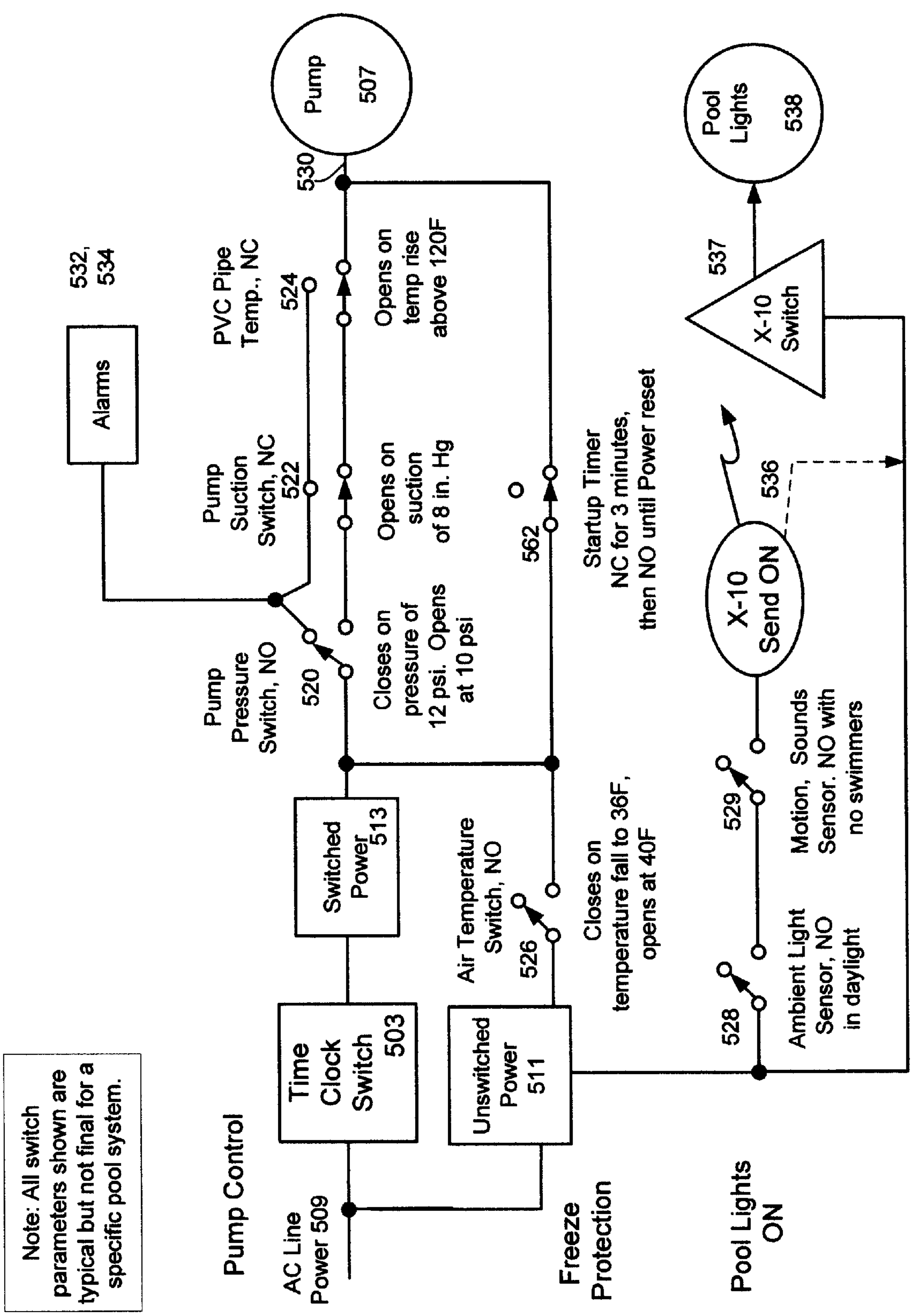
FIG. 11 is an electrical schematic of the combinatorial logic embodied in the invention.

FIG. 11 is an electrical schematic of the combinatorial logic embodied in the invention. A simplified view of the logic and simplest implementation makes clear the basic flexibility of choices to embody the invention. A pressure switch 520 acts in series with a suction switch 522 in series with a PVC pipe temperature switch 524 to control power to the pump motor 507. Alarms 532 and 534 will be emitted when any one of the three switches is in an open state. The pump is also de-energized at the same time. An air temperature switch 526 is able to bypass the normal time clock in the event of freezing conditions requiring pool water circulation. A start-up timer 562 is able to bypass any open sensor switch for a period of time to allow pressures to stabilize. A set of sensors are arranged such that they measure ambient light 528 and monitor pool noise or motion 529. By suitable choices these sensors can be considered in series and when both low light and swimmer activity is sensed commands to turn pool lights ON 536 will be generated. Furthermore, these commands may be communicated over premises AC wiring network by available ×10 switch technology 537. At the pool lights 538 control an ×10 switch will receive the commands and energize the lights.

FIG. 12 comprises truth tables and logic gate diagrams illustrating the operation of a portion of the invention. The methodology of combinatorial logic is illustrated with a more versatile type of logic element, the integrated circuit logic gate. As shown, AND 670, OR 674, and NAND 682 gates are sufficient to create the combinations required by typical functions with minimal hardware. This embodiment is a good choice to replace relay logic, but is not necessarily smaller, or less expensive and is clearly not as rugged in the difficult electromagnetic and high temperature environment of an outdoor, power surge prone, and lightning intensive installation in summertime, southern states. Further levels of circuit integration are readily available and there are significant economies and size reduction possible if the quantities are large enough to justify the initial design costs. Again, the ruggedness and reliability of relay logic is important since we need a fail-safe approach in a safety system. It is worth noting, in this respect, that the prototype controller of the invention which is constructed with relay logic and sensor switches has survived the harsh environment described above without a failure while a much more integrated, IC populated, commercial pool solar heating controller, part of the same pool system, has required occasional replacements of the entire circuit board. Many observers within the pool controller market have complained that reliability is a major problem, and service a major expense. In matters of convenience reliability problems are an irritating issue, but in a safety system fail-safe reliability is all important.

Figure 13:
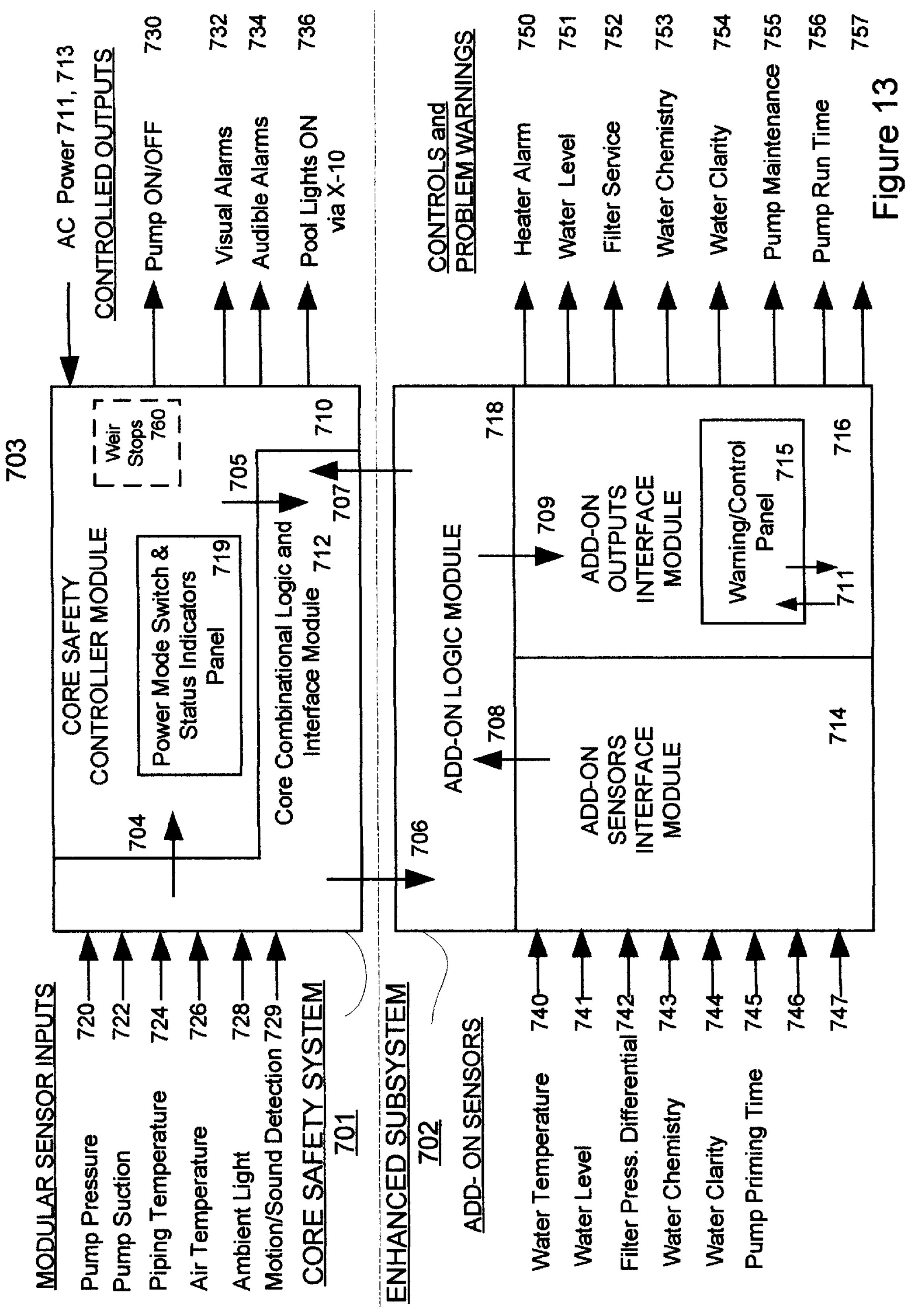
FIG. 13 is a schematic block diagram of an alternative embodiment of the invention.

FIG. 13 is a schematic block diagram of an alternative embodiment of the invention. Illustrated is the concept of a Core Safety System 701, that approximates the preferred embodiment previously described above, integrated with an Enhanced Subsystem 702 comprising add-on modules which provide many maintenance and convenience capabilities. The add-on sensors 740 through 747 are listed, as are the controls and problem warnings 750 through 757. The Add-On Logic Module 718 Add-On Sensors Interface Module 714 and Add-On Outputs Interface Module 716 are similar in concept to the Core Modules already described but may differ in the implementation in some cases depending on sensor characteristics. Some analog circuits may be necessary with comparators used to digitize the sensor data and prepare it for logic processing in the Add-On Logic Module 718. Problem Warnings 750 through 757 can be effected with the same voice message technology as previously described for the Portable Intelligent Remote Alarms (PIRA). Alternatively, the warnings can merely use lighted indicators and/or a text display, again communicating via the ×10 protocols described previously.

Figure 14:
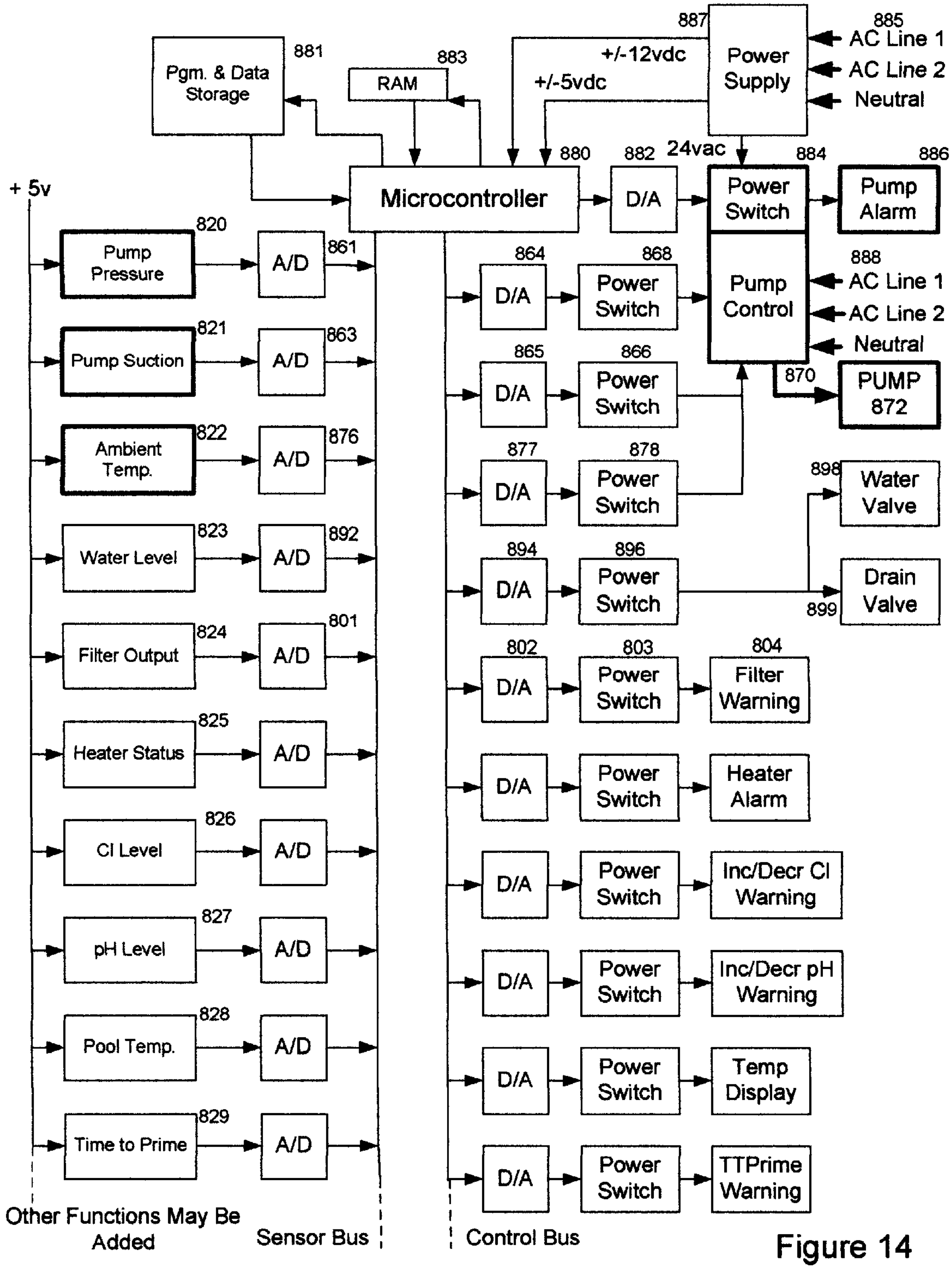
FIG. 14 is a schematic block diagram of an alternative embodiment that uses a microcontroller.

FIG. 14 is a schematic block diagram of an alternative embodiment that uses a microcontroller. The use of a microcontroller/microprocessor 880 is an obvious alternative and offers great flexibility and small size. However, the cost issues especially when considering maintenance and convenience features will be driven by the optional sensors 820 through 829 and their associated control elements, if automatic corrective action is to be provided for chlorine level 826 and pH level 827. Those overall costs will certainly exceed the cost of the safety related portions of the system, which has been the main rationale behind this invention. Thus it may be seen that this microcontroller alternative is most useful in the maximal situation, and not in the simple, safety driven, high reliability application.

FIG. 15 is an electrical circuit schematic diagram of a new and novel feature of the invention. Shown is a test circuit that is used to verify that each solenoid valve coil 900 presents a normal resistance value at each start-up. The solenoid valve coils are typically 24 vac 901. It is simple to disconnect the solenoid coil 900 at each end by a relay, shown as switches 906 and 907 for clarity, since the solenoids 900 are not used at start-up. Thus, we feed the 12 vdc 917 via R2 916 and R1 914. A 2 level Comparator 910 measures the voltage across terminals 913 and 915 which is influenced by the solenoid coil 900 resistance r. The equation relating the normal voltage 918 and r, R1, and R2 is shown in FIG. 15. Since the expected failure modes of a solenoid coil are a short circuit or an open circuit, that would result in a low voltage or a high voltage respectively at the Comparator output 919. The normal output voltage can be made to differ sufficiently from either failure mode, by proper choice of R1 914 and R2 916 once the actual value of the solenoid coil 900 is known. An improper value on this test will cause a shut-down and warning.

FIG. 16 depicts the test pieces that are used to provide an end-to-end test of the protection system. These tests are very simple, and fast and may be run as frequently as the pool operator desires. The Pressure and Suction Shutdown tests quickly verify that all portions of the safety protection system including the pressure and suction sensors, the Shutdown Module, the Remote Alarms Interface Module, the ×10 Interface Module, and the Portable Intelligent Remote Alarms (PIRA) are functioning normally. This is a great confidence builder for the pool users and operators. FIG. 2 provides the details of the system configuration.

The tests are run with the test pieces shown in FIG. 16. The Pressure Test Pipe 920 is a piece of 1.25 inch PVC pipe 920 approximately 3 feet long. It is open on one end and joined with a standard Skimmer Adapter Nozzle 926 at the other end. Thus, the pipe, when inserted into the skimmer well outlet 922 displaces the water flowing to the pump and freely admits air to create a loss of prime by the pump. The time it takes for the pump to empty the water from the connecting length of pipe determines how long before the shut-down will occur and the Alarms sound off. This time for this test is typically less than 10 seconds.

The Suction Shutdown Test Pipe is also a piece of 1.25 inch PVC pipe 932 approximately 3 feet long. It is open on one end and capped with a standard PVC pipe cap 934 on the other end. A rubber pad 936 is cemented over the pipe cap 934 to make a reasonable seal. The rubber dimensions are not critical. Thus, the pipe, when placed over the skimmer well outlet 922 will instantly create a higher than normal level of suction at the pump, which sensed by the suction sensor switch results in an immediate pump shut-down, suction venting by the suction dump solenoid valve, and activation of the proper Alarms. The response time of the system is a minor fraction of one second. Again, the test performance builds confidence in the safety system and the PIRA voice messages explain what has happened, what actions to take to correct the problem, and how to reset the system for normal automatic operation.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A stand alone Modular Integrated Multifunction Pool Safety Controller (MIMPSC) for use with a swimming pool and/or spa or whirlpool hydraulic system, wherein said hydraulic system includes at least one pool pump having inlet and outlet lines, a pool drain line, a pool skimmer including a weir, at least one pool filter, and a pool light, said MIMPSC comprising:

combinatorial logic configured such that any one of several devices or means may be used to start the pool pump, but that any one of several other devices or means is able to automatically shut-down the pool pump, in the event of a system safety problem, regardless of which means was used to start the pool pump;

a Startup Module comprising a timer, one or more relays, a freeze sensor, terminals, and a logical System Ready signal generating means, electrically connected to a power relay which feeds power to said pool pump;

a Shutdown Module comprising at least one sensor selected from a group consisting of a suction sensor, a pressure sensor, and a pipe temperature sensor, and comprising a multiplicity of latching relays, terminals, a suction dump valve, and at least one local alarm, the Shutdown Module sensors and the suction dump valve being connected to suitable ports in the hydraulic system;

a Pool Lights ON Module communicating with said pool light and comprising an ambient light sensor, a movement sensor, a sound sensor, terminals, and a Pool Lights control interface, the Pool Lights ON Module sensors being located adjacent said pool and/or spa or whirlpool and elevated above a water level thereof;

an Alarm Interface Module comprising local alarms, terminals, and a suitable communications transmitter for triggering at least one Portable Intelligent Remote Alarms (PIRA);

said Portable Intelligent Remote Alarm (PIRA) comprising a communications receiver, a multiplicity of unique voice and sound status and action messages, and related visual status indicators, said PIRA including at least one alarm in close proximity to said pool and/or spa or whirlpool or remotely thereof and having the ability to be activated via a modem/dialer;

a pool Drain Module comprising an electrically controlled drain valve, a timer, terminals, and a means of causing the pump to startup when necessary, the drain valve being connected to a suitable port in the pool drain line;

at least one Weir Stop comprising a physical barrier adapted to prevent the weir from becoming stuck in a blocking position, said weir stop being connected to interior side walls of said pool skimmer; and wherein the Modules are housed in a cabinet or junction box in close proximity to said pool pump.

2. The stand alone Modular Integrated Multifunction Pool Safety Controller as claimed in claim 1 wherein a communication interface with the Portable Intelligent Remote Alarm uses an ×10 automation protocol.

3. The stand alone Modular Integrated Multifunction Pool Safety Controller as claimed in claim 1 further comprising a configuration for testing all solenoid valves of said system at start-up of said pump to assure coil continuity, wherein if normal continuity does not exist, the pump will shut down and a warning signal will be provided.

4. The stand alone Modular Integrated Multifunction Pool Safety Controller as claimed in claim 1 further comprising the suction dump valve being direct acting, including inlet and outlet fine screens to avoid particle contamination of a valve seat of said suction dump valve, being timer controlled, being in connection to a pump suction port of said pool pump, and being configured to break a vacuum by admitting air when triggered.

5. The stand alone Modular Integrated Multifunction Pool Safety Controller as claimed in claim 1 further comprising at least one of a group consisting of a pool filter cleaning alert, a pool chemistry management means, a pump maintenance warning indicator, heater controls and a temperature warning indicator.

6. The stand alone Modular Integrated Multifunction Pool Safety Controller as claimed in claim 1 further comprising test pipe segments, to block the skimmer outlet to the pump, for an excess suction test, and a pipe to admit air and block water from a skimmer outlet to the pump, for a loss of prime test.

7. The stand alone Modular Integrated Multifunction Pool Safety Controller as claimed in claim 1 further comprising, said Safety Controller being configured such that in the event of the pump being shut-down because of a suction or pressure problem, a main pool power switch must be recycled in order to resume pump operation and to stop any alarms.

8. The stand alone Modular Integrated Multifunction Pool Safety Controller as claimed in claim 1 further comprising, said Safety Controller being configured such that in the event of a power failure, automatic restart of the pump occurs when power is restored.

9. The stand alone Modular Integrated Multifunction Pool Safety Controller as claimed in claim 1 further comprising, said system including a pool water drain hose communicating with said pool drain line and comprising a flat flexible plastic hose being about 2 inches wide at rest and further comprising a small plastic reel wide enough to coil up the flat hose and adapted to unreel the hose automatically in response to water pressure projecting the reel forward an end of the hose being attached to the reel with a thermal or chemical bonding agent on a top side of the hose so that the flow is unobstructed, said reel further including a spring adapted to automatically recoil the hose when the pool Drain Module timer closes the drain valve and the water pressure ceases.

10. The stand alone Modular Integrated Multifunction Pool Safety Controller as claimed in claim 1 further comprising wherein relay logic functions of said MIMPSC can be performed by one or more of a group consisting of transistors, Integrated Circuits, gates, gate arrays, PROMs, and microcontrollers/microprocessors, wherein all said Modules include one or more interconnections selected from a group consisting of sockets, printed circuits, point-to-point wiring, and ribbon cables, wherein said Portable Intelligent Remote Alarm uses an ×10 automation protocol radio link, IR link, or other electromagnetic and sonic technique, wherein all said sensors are selected from a group consisting of suction switches, pressure switches, temperature switches, flow switches, semiconductors, strain gauges, bourdon tubes, mercury manometers, and ultrasonic based.

11. In a swimming pool and/or spa hydraulic system including, at least one pool pump having inlet and outlet lines, a pool drain line a pool skimmer including a weir, at least one pool filter, a pool light, and a prior art Pool Controller, the improvement comprising a Modular Integrated Multifunction Pool Safety Controller (MIMPSC) integrated with said prior art Pool Controller, said MIMPSC comprising:

combinatorial logic configured such that any one of several devices or means may be used to start the pool pump, but that any one of several other devices or means is able to automatically shut-down the pool pump, in the event of a system safety problem, regardless of which means was used to start the pool pump;

a Startup Module comprising a timer, one or more relays, a freeze sensor, terminals, and a logical System Ready signal generating means, electrically connected to a power relay which feeds power to said pool pump;

a Shutdown Module comprising at least one sensor selected from a group consisting of a suction sensor, a pressure sensor, and a pipe temperature sensor, and comprising a multiplicity of latching relays, terminals, a suction dump valve, and at least one local alarm, the Shutdown Module sensors and the suction dump valve being connected to suitable ports in the hydraulic system;

a Pool Lights ON Module communicating with said pool light and comprising an ambient light sensor, a movement sensor, a sound sensor, terminals, and a Pool Lights control interface, the Pool Lights ON Module sensors being located adjacent said pool and/or spa or whirlpool and elevated above a water level thereof;

an Alarm Interface Module comprising local alarms, terminals, and a suitable communications transmitter for triggering at least one Portable Intelligent Remote Alarm (PIRA);

said Portable Intelligent Remote Alarm (PIRA) comprising a communications receiver, a multiplicity of unique voice and sound status and action messages, and related visual status indicators, said PIRA including at least one alarm in close proximity to said pool and/or spa or whirlpool or remotely thereof and having the ability to be activated via a modem/dialer;

a pool Drain Module comprising an electrically controlled drain valve, a timer, terminals, and a means of causing the pump to startup when necessary, the drain valve being connected to a suitable port in the pool drain line;

at least one Weir Stop comprising a physical barrier adapted to prevent the weir from becoming stuck in a blocking position, said weir stop being connected to interior side walls of said pool skimmer; and wherein the Modules are housed with said prior art pool controller in a cabinet or junction box in close proximity to said pool pump.

12. The integrated Modular Integrated Multifunction Pool Safety Controller as claimed in claim 11 wherein a communication interface with the Portable Intelligent Remote Alarm uses an ×10 automation protocol.

13. The integrated Modular Integrated Multifunction Pool Safety Controller as claimed in claim 11 further comprising a configuration for testing all solenoid valves of said system at start-up of said pump to assure coil continuity, wherein if normal continuity does not exist, the pump will shut down and a warning signal will be provided.

14. The integrated Modular Integrated Multifunction Pool Safety Controller as claimed in claim 11 further comprising the suction dump valve being direct acting, including inlet and outlet fine screens to avoid particle contamination of a valve seat of said suction dump valve, being timer controlled, being in connection to a pump suction port of said pool pump, and being configured to break a vacuum by admitting air when triggered.

15. The integrated Modular Integrated Multifunction Pool Safety Controller as claimed in claim 11 further comprising at least one of a group consisting of a pool filter cleaning alert, a pool chemistry management means, a pump maintenance warning indicator, heater controls and a temperature warning indicator.

16. The integrated Modular Integrated Multifunction Pool Safety Controller as claimed in claim 11 further comprising test pipe segments, to block the skimmer outlet to the pump, for an excess suction test, and a pipe to admit air and block water from a skimmer outlet to the pump, for a loss of prime test.

17. The integrated Modular Integrated Multifunction Pool Safety Controller as claimed in claim 11 further comprising, said Safety Controller being configured such that in the event of the pump being shut-down because of a suction or pressure problem, a main pool power switch must be recycled in order to resume pump operation and to stop any alarms.

18. The integrated Modular Integrated Multifunction Pool Safety Controller as claimed in claim 11 further comprising, said Safety Controller being configured such that in the event of a power failure, automatic restart of the pump occurs when power is restored.

19. The integrated Modular Integrated Multifunction Pool Safety Controller as claimed in claim 11 further comprising, said system including a pool water drain hose communicating with said pool drain line and comprising a flat flexible plastic hose being about 2 inches wide at rest and further comprising a small plastic reel wide enough to coil up the flat hose and adapted to unreel the hose automatically in response to water pressure projecting the reel forward an end of the hose being attached to the reel with a thermal or chemical bonding agent on a top side of the hose so that the flow is unobstructed, said reel further including a spring adapted to automatically recoil the hose when the pool Drain Module timer closes the drain valve and the water pressure ceases.

20. The integrated Modular Integrated Multifunction Pool Safety Controller as claimed in claim 11 further comprising wherein relay logic functions of said MIMPSC can be performed by one or more of a group consisting of transistors, Integrated Circuits, gates, gate arrays, PROMs, and microcontrollers/microprocessors, wherein all said Modules include one or more interconnections selected from a group consisting of sockets, printed circuits, point-to-point wiring, and ribbon cables, with wherein said Portable Intelligent Remote Alarm uses an ×10 automation protocol radio link, IR link, or other electromagnetic and sonic technique, wherein all said sensors are selected from a group consisting of suction switches, pressure switches, temperature switches, flow switches, semiconductors, strain gauges, bourdon tubes, mercury manometers, and ultrasonic based.

* * * * *